(12) United States Patent
Rynearson

(10) Patent No.: US 11,746,908 B2
(45) Date of Patent: Sep. 5, 2023

(54) ROTATING SHAFT SEAL HAVING AN EASILY INSTALLED AND EASILY REMOVED INTERNAL COOLING CHANNEL

(71) Applicant: Flowserve Pte. Ltd., Singapore (SG)

(72) Inventor: Rodney Wayne Rynearson, Kalamazoo, MI (US)

(73) Assignee: Flowserve Pte. Ltd., Singapore (SG)

( * ) Notice: Subject to any disclaimer, the term of this patent is extended or adjusted under 35 U.S.C. 154(b) by 107 days.

(21) Appl. No.: 17/479,535

(22) Filed: Sep. 20, 2021

(65) Prior Publication Data

US 2023/0092010 A1 Mar. 23, 2023

(51) Int. Cl.
*F16J 15/44* (2006.01)
*F16J 15/447* (2006.01)

(52) U.S. Cl.
CPC .................................. *F16J 15/447* (2013.01)

(58) Field of Classification Search
CPC .............................. F16J 15/34; F16J 15/3404
See application file for complete search history.

(56) References Cited

U.S. PATENT DOCUMENTS

| | | | | |
|---|---|---|---|---|
| 2,223,519 A | * | 12/1940 | Hornschuch | F16J 15/183 277/516 |
| 3,291,489 A | * | 12/1966 | Alley | F16J 15/38 277/408 |
| 3,888,495 A | * | 6/1975 | Mayer | F04D 29/043 277/927 |
| 5,125,792 A | * | 6/1992 | Korenblit | F04D 29/108 415/110 |
| 8,814,508 B2 | * | 8/2014 | Puggioni | F04D 29/584 415/177 |
| 9,388,905 B2 | * | 7/2016 | Takahashi | F04D 29/126 |
| 2016/0265567 A1 | | 9/2016 | Van | |
| 2021/0246983 A1 | | 8/2021 | Cohen-Zada | |

FOREIGN PATENT DOCUMENTS

| | | | | |
|---|---|---|---|---|
| CN | 102472393 A | * | 5/2012 | ......... F16J 15/3404 |
| EP | 2631419 A1 | | 8/2013 | |
| WO | 2005026589 A1 | | 3/2005 | |
| WO | WO-2018123617 A1 | * | 7/2018 | ............ F16J 15/162 |

OTHER PUBLICATIONS

Flowserve. "Mechanical Seal Guidelines for Pharmaceutical Applications."
International Search Report for PCT Appl. No. PCT/US2022/043610 dated Dec. 29, 2022, 12 pages.

\* cited by examiner

*Primary Examiner* — Vishal A Patel
(74) *Attorney, Agent, or Firm* — Maine Cernota & Rardin

(57) ABSTRACT

An open cooling space or spiral cooling channel is formed between channel walls of a spool and an outer housing of a rotating shaft seal. The spool is sealed to the housing at the two ends thereof, does not intrude into the cooling inlet or outlet, and is axially removable and exchangeable without being distorted, thereby avoiding damage to the spool and/or contact between the spool and rotating seal elements. Due to the easy installation and removal of the spool, it can be installed as an upgrade after seal installation, and is easily cleaned and replaced. The cooling channel can be terminated by inlet and outlet rings, such that the spool does not require any rotational alignment within the seal assembly. The cooling channel can have a square or rectangular cross-section, thereby increasing thermal exchange between the cooling channel and the cooling channel spool rendering the cooling more efficient.

10 Claims, 7 Drawing Sheets

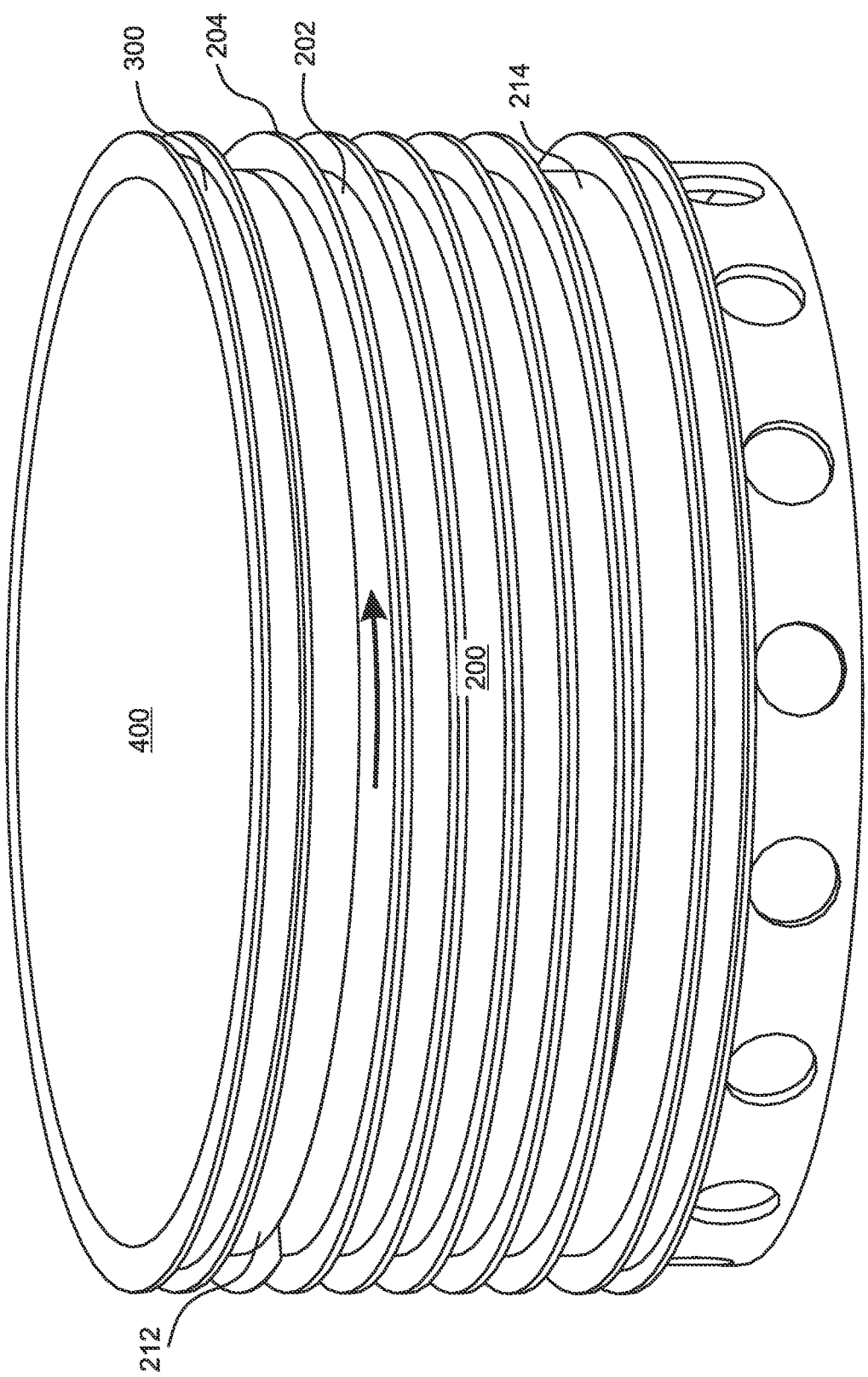

ROTATING SHAFT SEAL HAVING AN EASILY INSTALLED AND EASILY REMOVED INTERNAL COOLING CHANNEL

FIELD OF THE INVENTION

The invention relates to rotating shaft seals, and more particularly, to apparatus and methods for interior cooling of rotating shaft seals.

BACKGROUND OF THE INVENTION

Pumps, turbines, and other types of rotating shaft apparatus frequently require that a seal be formed between the rotating shaft and the surrounding static housing, so as to prevent leakage into the environment of a lubricant or a process fluid along the rotating shaft. Examples including packing seals, labyrinth seals, contacting face seals, and end face mechanical seals, among others.

Virtually all rotating shaft seals leak, either by design (e.g. end face mechanical seals and labyrinth seals) and/or due to wear (e.g. packing seals, contacting face seals). However, some rotating shaft seal applications require that any leakage into the environment of a contained fluid, referred to herein generically as a "process fluid," must be prevented. One approach to solving this problem is to apply a barrier fluid to the environment-side of the seal at a pressure that is higher than the process fluid pressure, so that any leakage will be of the barrier fluid into the process fluid, and not of the process fluid into the barrier fluid and thence, potentially, into the environment. One approach is to provide a dual seal, wherein two proximal but spaced-apart seals are formed with the rotating shaft, and wherein a "barrier fluid" space between the two seals is filled with the pressurized barrier fluid.

In some cases, elements within a seal can be subject to overheating, for example due to heat transferred from surrounding apparatus, such as a tank or a pump casing; heat transferred from the environment, such as direct sunlight or heated air (for example in a foundry); and/or heat generated by the seal itself, for example due to friction between contacting seal faces or between the rotating shaft and packing, or viscous heating of process fluid between the end faces of an end face mechanical seal. Among other consequences, such heating of the seal can result in damage to elastomers within the seal, breakdown of the fluids circulating within the seal, and/or reduced tribological properties at the seal face interface.

Accordingly, with reference to FIG. 1A, for applications where overheating is a potential problem, rotating shaft seals sometimes include a cooling system, whereby a cooling liquid is caused to flow through a cooling space 105 provided within the seal. The cooling liquid is then caused to pass through a radiator or other cooling mechanism (not shown), before it is recycled through the seal. In the simple case of FIG. 1A, the cooling space 105 is a cooling "jacket" that merely surrounds the region to be cooled, and includes little if any internal structure.

With reference to FIG. 1B, in other approaches where more uniform cooling of the seal is required, a coiled tube 106 is sometimes included as a cooling channel within the seal. The coiled tube 106 provides a directed and controlled flow of the thermal transfer medium within the seal, thereby ensuring that the cooling flow is uniform over an internal volume within the seal.

In the examples of FIGS. 1A and 1B, a dual end face mechanical seal assembly surrounds a rotating shaft 100, and includes a barrier fluid space 104 located between the two sealing areas 102 that is filled with a pressurized barrier fluid which enters the barrier fluid space 104 via port BI 116, and exits the barrier fluid space 104 via port BO 118. In lieu of the cooling space 105 of FIG. 1A, the example of FIG. 1B includes a coil of stainless-steel tubing 106 within the barrier fluid space 104 through which a cooling liquid can be circulated, thereby ensuring that the barrier fluid space 104 is evenly cooled by the cooling liquid. Inlet (CI) 110 and outlet (CO) 120 ports are provided for connection of the cooling coil 106 to the cooling liquid supply.

It should be noted that, unless otherwise required by context, the expression "barrier fluid space" is used herein generically to refer to any internal space within a seal that is to be cooled by a cooling medium, whether or not the barrier fluid space is actually filled with a barrier fluid.

As can be seen in FIG. 1B, the ends 112 of the stainless-steel tubing coil 106 are bent substantially at right angles, so that they protrude into the CI 110 and CO 120 ports. Seals 114 are provided between the protruding tube ends 112 and the seal housing 108. This allows for direct connection between the coolant circulation system and the cooling coil 106, for example by threading the ends of metal tube fittings into the inlet and outlet ports 110, 120 and over the protruding ends 112 of the stainless-steel tubing coil 106.

During the seal's lifetime, it can be desirable to insert and/or remove the cooling coil at least once, and possibly many times. For example, if it is discovered, after installation of a seal that lacks a cooling coil 106, that the seal is subject to overheating, it may be desirable to disassemble the seal and to install a cooling coil 106. Similarly, if the cooling coil 106 within a seal should become clogged for any reason, it may be desirable to remove the cooling coil 106 from the seal so that it can be more easily cleaned or replaced.

Unfortunately, while the approaches of FIG. 1A and FIG. 1B can be effective for cooling a seal, it is problematic to install the cooling space 105 or cooling coil 106 into the seal, and to remove the cooling space 105 or cooling coil 106 from the seal. If a cooling space 105 is included, as in FIG. 1A, it is typically welded into place and cannot be easily added or removed after manufacture of the seal. If a cooling coil 106 is included, as in FIG. 1B, installation and removal of the cooling coil 106 is difficult largely due to the requirement of bending the ends 112 of the cooling coil 106 at the cooling inlet port 110 and the cooling outlet port 120, as well as a requirement that the cooling coil 106 must be rotationally aligned within the seal. Typically, each time a cooling coil 106 is removed, it is necessary to use a special tool to press the ends 112 of the coil 106 toward the shaft 100, so that they no longer protrude into the holes made within the seal housing 108 which allow the coil ends 112 to engage with fittings installed in the CI 110 and CO 120 ports, thereby enabling the entire assembly to be axially removed from the seal. Similarly, when installing a cooling coil, it is necessary to use a special tool to capture and press the ends 112 of the cooling coil 106 away from the shaft 100, so that they project into the CI 110 and CO 120 ports far enough to connect with the threaded ends of the metal tube fittings installed in in the CI 110 and CO 120 ports.

This requirement in FIG. 1B of manipulating the ends 112 of the cooling coil 106 each time it is installed or removed from the seal greatly increases the difficulty of the installation and removal procedures. Also, the requirement to rotationally align the cooling coil 106 with the seal makes the installation process even more complex. In addition, the process of installing and/or uninstalling the protruding ends 112 of the cooling coil 106 can cause deformation of the shape of the cooling coil 106 near its ends 112. In the worst case, this can lead to direct contact between the cooling coil 106 and underlying, rotating components 122 of the seal, thereby causing the seal to fail.

What is needed, therefore, is a rotating shaft seal that includes an internal cooling space or cooling channel through which a cooling liquid can be circulated, thereby providing cooling of an internal volume of the seal, referred to generically herein as the "barrier fluid space," wherein the cooling space or channel can be easily installed in and removed from the seal as needed without deformation of the cooling space or channel, wherein the cooling space or channel is easily cleaned when removed from the seal, and preferably wherein no special rotational alignment of the cooling space or channel is required within the seal.

SUMMARY OF THE INVENTION

The present invention is a rotating shaft seal assembly that includes an internal cooling space or cooling channel through which a cooling liquid can be circulated, thereby providing cooling of an internal volume of the seal, referred to generically herein as the "barrier fluid space." The cooling space or channel is formed within the seal assembly by a cooling spool that can be easily installed in and removed from the seal assembly as needed, without deformation of the cooling spool. Furthermore, the cooling spool is easily cleaned when it is removed from the seal assembly. In embodiments, the cooling spool does not require any rotational alignment within the seal assembly.

Instead of implementing a permanently installed cooling space or a coil of tubing within a barrier fluid space, the cooling space or channel of the present invention is formed between the cooling spool and the surrounding housing of the seal, and is bounded by spool walls that extend radially outward from a cooling core of the cooling spool.

Spool seals between the cooling spool and the surrounding seal assembly housing are provided at both ends of the cooling spool, with the cooling space or channel being located therebetween. As a result, any small amount of leakage of cooling liquid that may occur over the end walls and/or channel walls is contained between the spool seals, and thereby prevented from leaking beyond the cooling spool.

A cooling inlet and a cooling outlet are formed in the seal assembly housing that enable connection of a cooling liquid circulating system to the cooling space or channel. However, no part of the cooling space or channel extends into the coolant inlet or outlet. Instead, the cooling inlet and outlet simply terminate in openings through the housing which allow a cooling liquid to enter and exit the cooling space or channel through the cooling inlet and outlet. Because the outward facing side of the cooling space or channel is open, and because the ends of the cooling spool are sealed to the housing, there is no need for any special connection or seal between the cooling space or channel and the cooling inlet or outlet.

As a result, no distortion or modification of the cooling spool is required during installation of the cooling channel spool into the seal assembly and/or removal thereof from the seal assembly. Accordingly, there is no danger of contact between the rigid cooling channel spool and any rotating components within the seal assembly.

In embodiments that form a cooling space within the seal, the cooling spool is a cooling space spool that includes only a pair of end walls proximate each end of the cooling spool, while the remainder of the cooling spool between the spool walls does not extend beyond the cooling core of the spool. When the cooling space spool is removed from the seal, the space between the end walls is open, such that the cooling space can be easily inspected and cleaned.

In embodiments that form a cooling channel within the seal, the cooling spool is a cooling channel spool from which a single channel wall extends outward from the cooling core of the cooling channel spool and surrounds the spool in a spiral pattern, such that a spiral cooling channel is formed between the channel wall and the surrounding housing. Because the channel wall appears in cross section to be a plurality of walls, the channel wall is sometimes referred to herein in the plural.

In some of these embodiments, the cooling channel has a substantially square or rectangular cross-section. The cooling channel, when not installed in the seal assembly, is actually a trough that is formed on the cooling channel spool, in that it is open on an outwardly facing side thereof. However, the channel walls are configured such that when the cooling channel spool is installed within the seal assembly, the channel walls extend radially outward into close proximity with a surrounding housing of the seal assembly, thereby limiting any leakage of cooling liquid over the channel walls.

In some cooling channel embodiments, the cooling channel is terminated on the cooling channel spool by an inlet ring at one end and an outlet ring at the other end. Accordingly, during installation of the cooling channel spool in the seal assembly it is only necessary to axially align the inlet and outlet rings with the cooling inlet and outlet. No rotational alignment of the cooling channel spool is needed. This approach further simplifies the installation process.

In various embodiments, only small and relatively inexpensive adaptations of the seal assembly are required so as to render it compatible with the disclosed cooling spool. As such, the adapted seal assembly can be produced in larger quantities and marketed with pre-installed cooling spools to customers who anticipate a need to cool the seal assembly, while marketing the same seal assembly without cooling spools to customers who do not anticipate overheating of the seal assembly, knowing that the disclosed cooling spool can be subsequently installed in any of those seal assemblies that unexpectedly experience overheating. In some embodiments, it is also possible to remove a cooling space spool and replace it with a cooling channel spool, or vice versa, for example if a need for more uniform cooling or a need for a higher volume of cooling fluid flow is discovered after installation of the seal.

In some embodiments, the barrier fluid space into which the cooling channel spool is inserted is configured to contain a pressurized barrier fluid so as to prevent any escape of the process fluid into the environment. When inserted into the seal assembly, the cooling spool is in thermal, but not fluid, communication with the barrier fluid through the body of the cooling spool. In similar embodiments, the "barrier fluid space" is not configured to contain a barrier fluid, but is nevertheless cooled by a cooling medium flowing through the cooling space or cooling channel.

Advantages of the present invention in various embodiments include:

- no welding is required to fabricate, install, or seal the cooling channel spool within the seal assembly, thereby reducing manufacturing costs;
- the cooling channel spool may be added to a seal assembly by the customer at a future date without any modifications to the existing seal assembly;

the cooling channel spool can be removed and installed without any special tools;

if it is determined after installation of a seal assembly having the disclosed cooling space spool or cooling channel spool installed therein that cooling of the seal assembly is not needed, the cooling space or channel spool can be either left in place and its ports simply plugged, or it can be removed from the seal assembly, and then the seal assembly replaced into service, knowing that if conditions change and the cooling space or channel spool is once again needed, it can be re-installed and returned to service;

the present invention requires only simple CI and CO connections that terminate in through-holes that penetrate the main housing, without requiring that the CI and CO include any seals because the cooling spool is rigid and is not distorted during insertion and removal from the seal assembly, the internal tolerances of the seal assembly can be controlled more tightly, and any danger that the cooling spool might come into contact with rotating elements of the seal assembly is eliminated.

in embodiments that implement a cooling channel spool, the amount of time during which a cooling fluid is in contact with the metal body of the cooling channel spool is uniform for nearly all of the cooling fluid;

in embodiments that implement a cooling channel spool having a substantially square cross-section, the rate of thermal exchange between the cooling channel and the cooling channel spool is optimized;

It will be clear to one of skill in the art that the present invention can be adapted to almost any type of rotating shaft seal assembly, including labyrinth seals, contacting face seals, and end face mechanical seals, and that the invention can be adapted to single seal assemblies, as well as to dual seal assemblies, triple seal assemblies, etc.

The present invention is a cooled rotating shaft seal assembly configured to prevent leakage of a process fluid through a housing along a rotating shaft. The rotating shaft seal assembly includes a first seal contained within a seal housing, the first seal being configured to inhibit leakage of the process fluid along the rotating shaft beyond the seal housing The first seal further includes an internal space, referred to herein as a barrier fluid space within the seal housing that is in thermal communication with the first seal, a cooling inlet and a cooling outlet formed in the seal housing and providing access through the seal housing to the cooling space without extending into the cooling space, and a cooling spool configured for removable insertion into the barrier fluid space of the rotating shaft seal. The cooling spool includes channel walls that extend radially outward from a substantially cylindrical cooling core of the cooling spool and terminate in outward facing ends thereof, the channel walls forming a cooling trough that surrounds the cooling core, the channel walls being configured such that when the cooling spool is installed within the barrier fluid space, the cooling core surrounds the rotating shaft without contacting the rotating shaft, and the channel walls extend radially outward from the cooling core into close proximity with the surrounding seal housing, thereby limiting any leakage of cooling liquid over the channel walls, and converting the cooling trough into a cooling passage that is suitable for circulation therethrough of a temperature modifying liquid, referred to herein as a cooling liquid, so as to decrease or increase a temperature of the first seal, inlet and outlet ends of the cooling passage being in liquid communication respectively with the cooling inlet and cooling outlet when the cooling spool is installed in the barrier fluid space, so that the cooling liquid can be circulated from the cooling inlet through the cooling passage to the cooling outlet, and first and second spool seals located proximal to opposing ends of the cooling spool, the cooling passage being located therebetween, wherein the first and second spool seals are configured to form seals between the ends of the cooling spool and the surrounding seal housing, thereby preventing any escape of the cooling liquid from the cooling spool.

In some embodiments, the cooling passage is a cooling space that surrounds the cooling core.

In other embodiments, the cooling passage is a spiral cooling channel that surrounds the cooling core. In some of these embodiments, a cross sectional shape of the cooling channel is substantially rectangular or square. In any of these embodiments, the inlet and outlet ends of the cooling channel can terminate in inlet and outlet channel rings, such that liquid access to the cooling channel through the cooling inlet and outlet requires axial alignment of the inlet and outlet channel rings with the cooling inlet and cooling outlet, but does not require rotational alignment of the cooling channel spool with the cooling inlet and outlet.

Any of the above embodiments can further include a second seal configured to inhibit leakage of the process fluid along the rotating shaft beyond the seal housing, the second seal being in thermal communication with the barrier fluid space, the barrier fluid space extending between the first and second seals. In some of these embodiments, the barrier fluid space is configured to contain a pressurized buffer fluid that prevents leakage of process fluid into the buffer fluid space.

In any of the above embodiments, the first seal can be a packing seal, a labyrinth seal, a contacting end face seal, or an end face mechanical seal.

And in any of the above embodiments, at least one of the spool seals can comprise an O-ring installed in a seal trough provided on the cooling spool.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4 is a perspective view of the cooling channel spool of FIG. 2B shown separated from the seal assembly.

DETAILED DESCRIPTION

The present invention is a rotating shaft seal assembly that includes an internal cooling space or channel through which a cooling liquid can be circulated, thereby cooling an internal volume of the seal, referred to generically herein as the "barrier fluid space." The cooling space or channel is formed by a cooling spool that can be easily installed in and removed from the seal assembly as needed, without deformation of the cooling spool. Furthermore, the cooling space or channel is easily cleaned when the cooling spool is removed from the seal assembly. In embodiments, the cooling spool does not require any rotational alignment within the seal assembly.

Figure 1A:
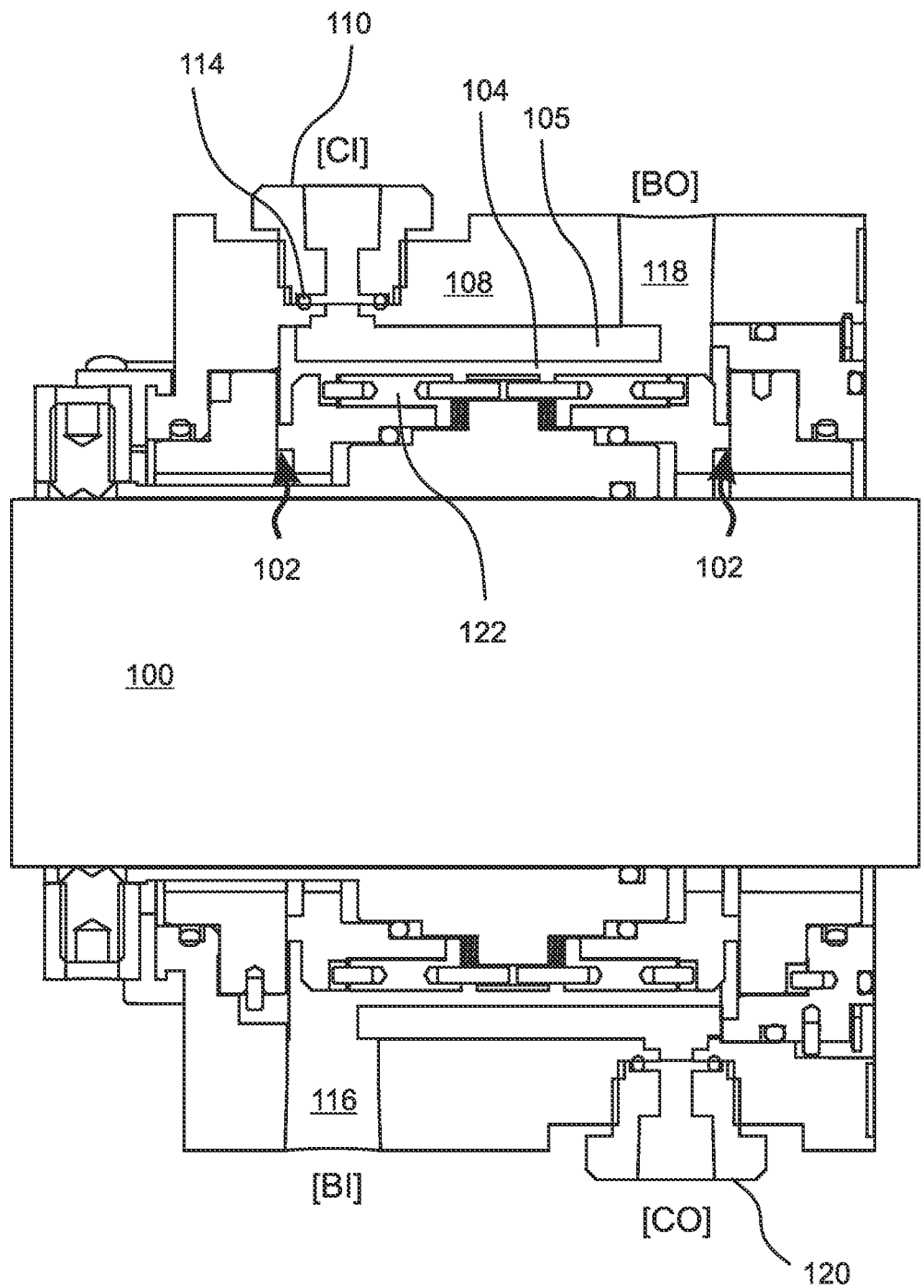
FIG. 1A is a cross-sectional illustration, drawn to scale, of a prior art seal assembly that includes a cooling space.
Figure 2A:
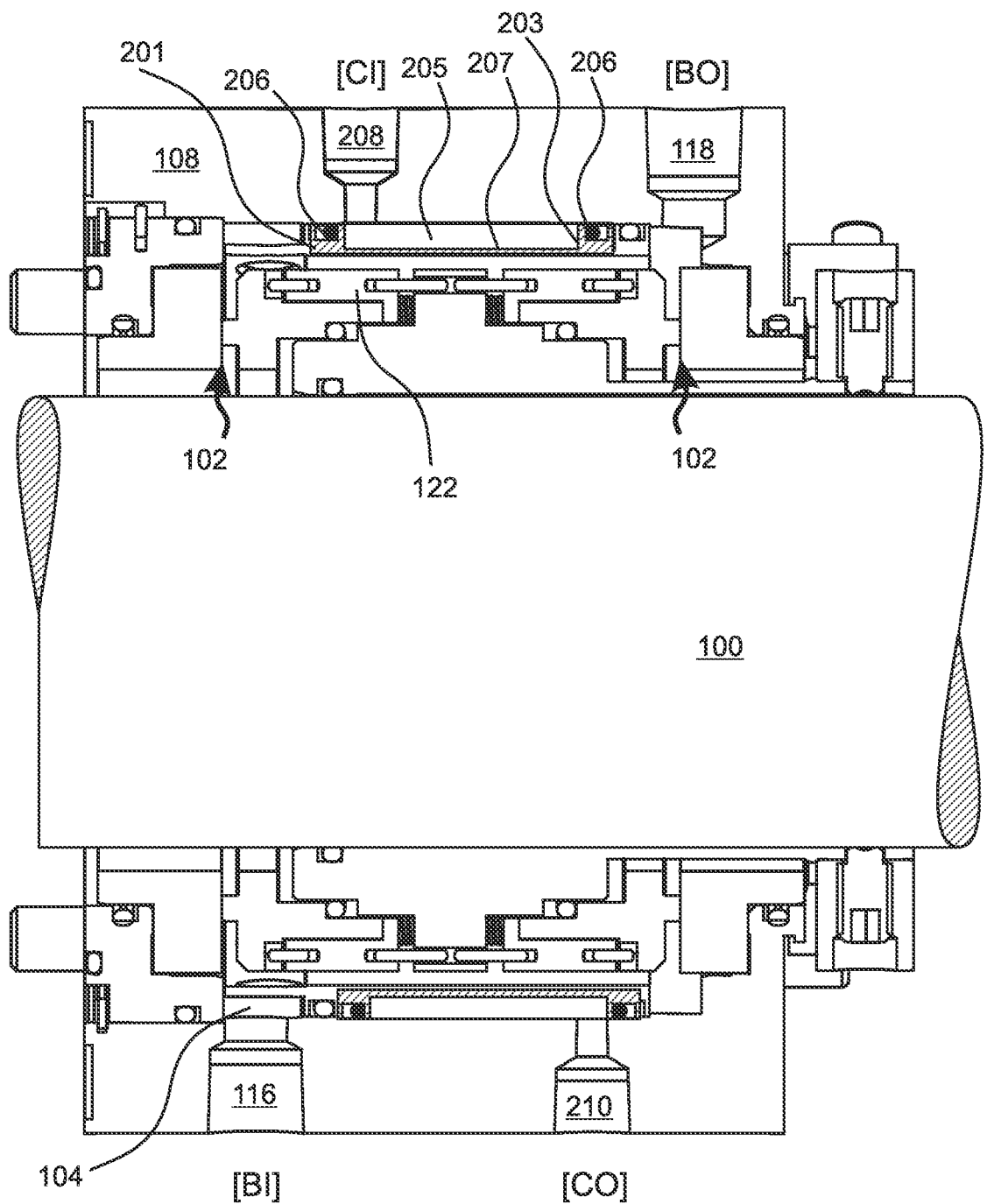
FIG. 2A is a cross-sectional illustration, drawn to scale, of an embodiment of the present invention having a cooling space spool installed therein.

With reference to FIG. 2A, in embodiments a cooling space 205 similar to the cooling space 105 of FIG. 1A is formed within the seal by a cooling space spool 201 that is inserted within a barrier fluid space 104. A cooling medium can flow into the cooling space 205 through port CI 208 and out from the cooling space through port CO 210. In the illustrated embodiment, the cooling spool is a cooling space spool 201 that includes only a pair of end walls 203 proximate to each end of the cooling space spool 201, while the remainder of the cooling space spool 201 between the spool walls 203 does not extend beyond the cooling core 207 of the cooling space spool 201. When the cooling space spool 201 is removed from the seal, the space between the end walls 203 is exposed, such that the cooling space 205 can be easily inspected and cleaned.

Figure 1B:
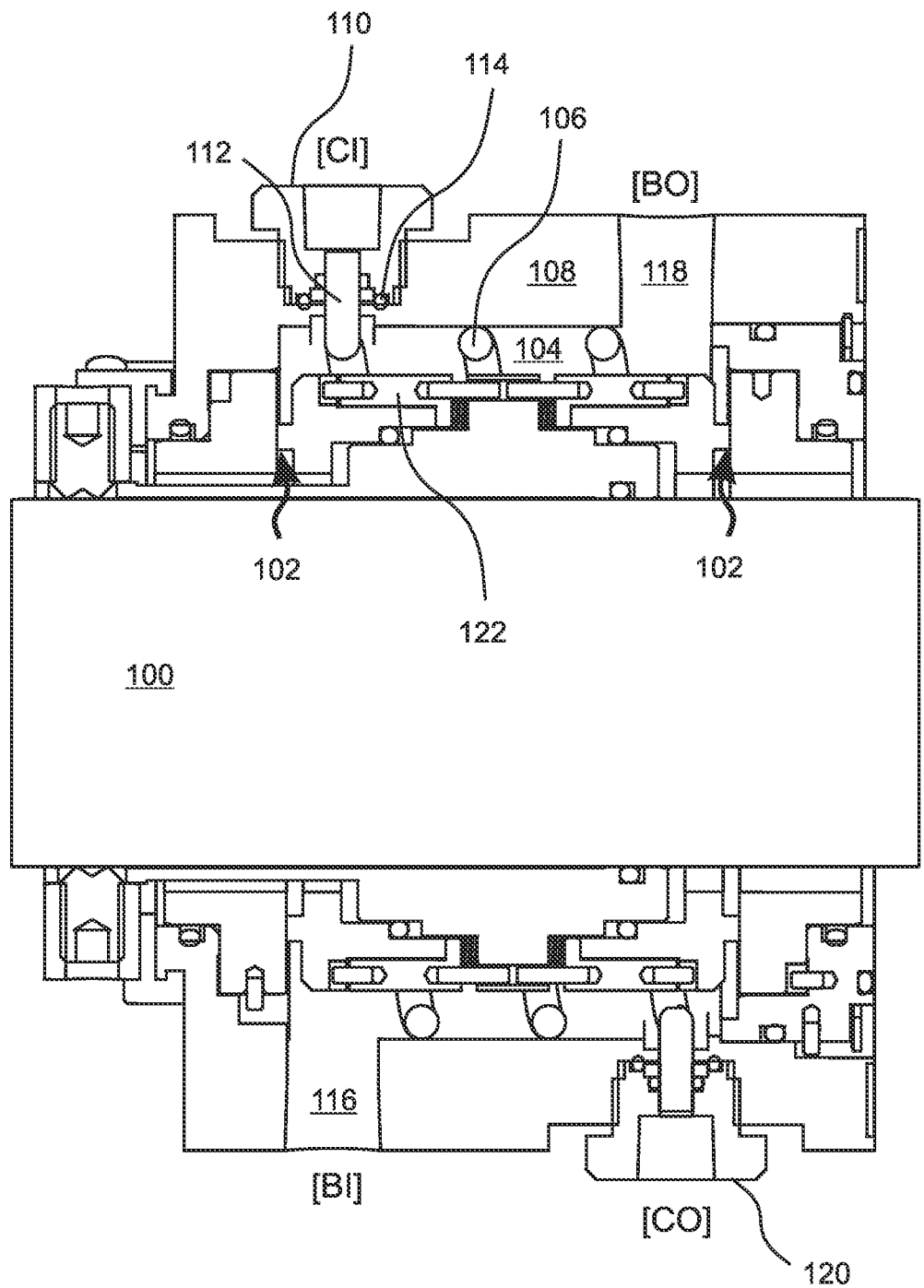
FIG. 1B is a cross-sectional illustration, drawn to scale, of a prior art seal assembly that includes a stainless-steel tubing cooling coil.
Figure 2B:
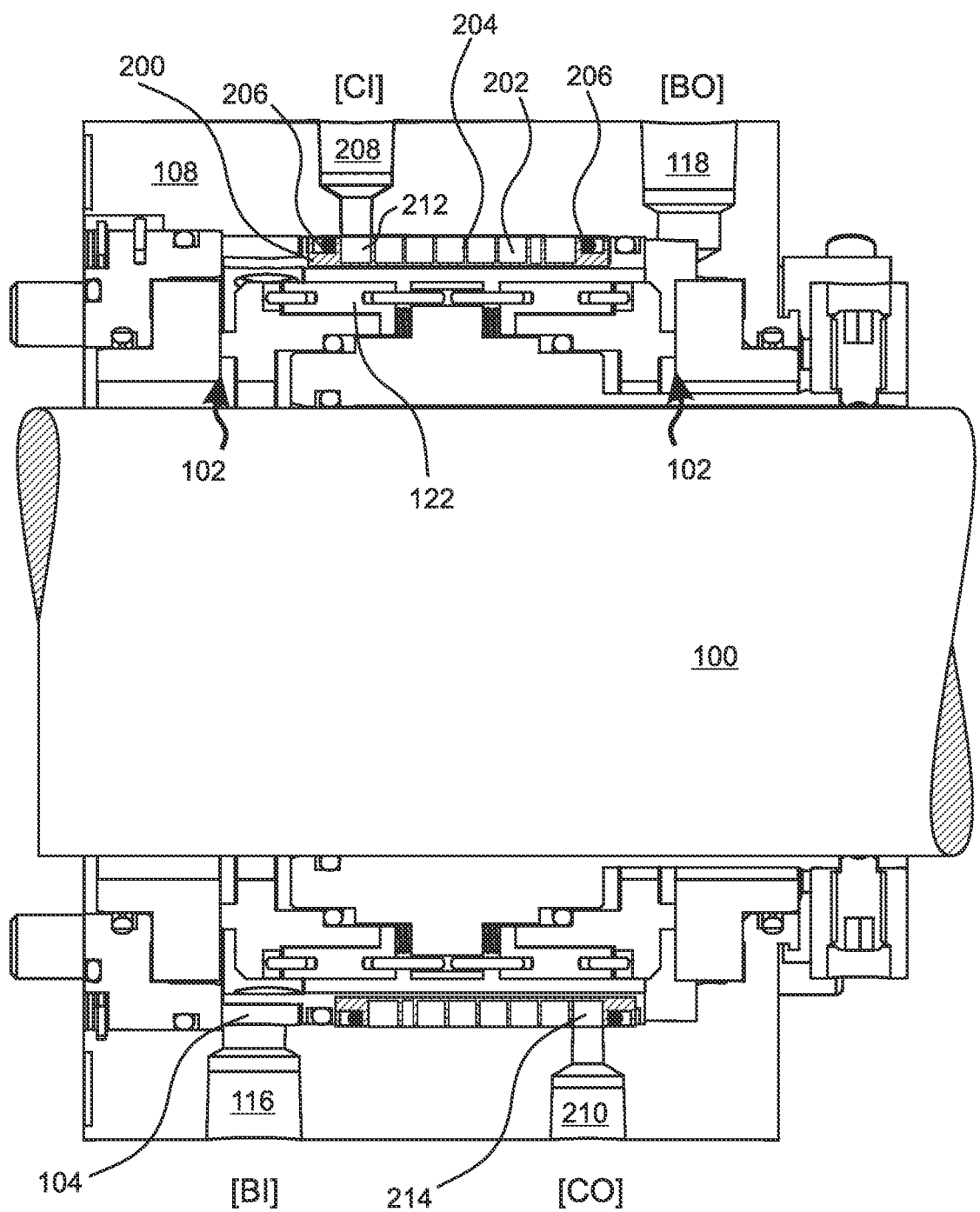
FIG. 2B is a cross-sectional illustration, drawn to scale, of an embodiment of the present invention having a cooling channel spool installed therein.

With reference to FIG. 2B, instead of implementing a coil of tubing 106 within a barrier fluid space 104, as in FIG. 1B, the cooling spool is a cooling channel spool 200 that combines with the surrounding housing 108 to form a cooling channel 202 that spirally surrounds the cooling channel spool 200 and is bounded by channel walls 204 that extend radially outward from a cooling core (400 in FIG. 4) of the cooling channel spool 200. It should be noted that, due to the spiral shape of the cooling channel 202, the "channel walls" 204 can be considered to be a single, spiral wall that repeatedly encircles the cooling channel spool 200.

In the embodiments of FIGS. 2A and 2B, the barrier fluid space 104 is configured to contain a barrier fluid that is pressurized so as to prevent any escape of the process fluid into the environment. In other embodiments, the "barrier fluid space" is not configured to contain a barrier fluid, but is nevertheless cooled by the cooling channel.

In FIG. 2B, the cooling channel 202 has a substantially square cross-section, thereby increasing the total area of thermal contact between the cooling liquid and the channel 202, so that cooling efficiency is maximized. In FIGS. 2A and 2B, the cooling space spool 201 and cooling channel spool 200, including the end walls 203 and channel walls 204, are cross-hatched so that they can be more easily differentiated from the cooling space 205 and cooling channel 202, and from the surrounding housing 108.

Figure 2C:
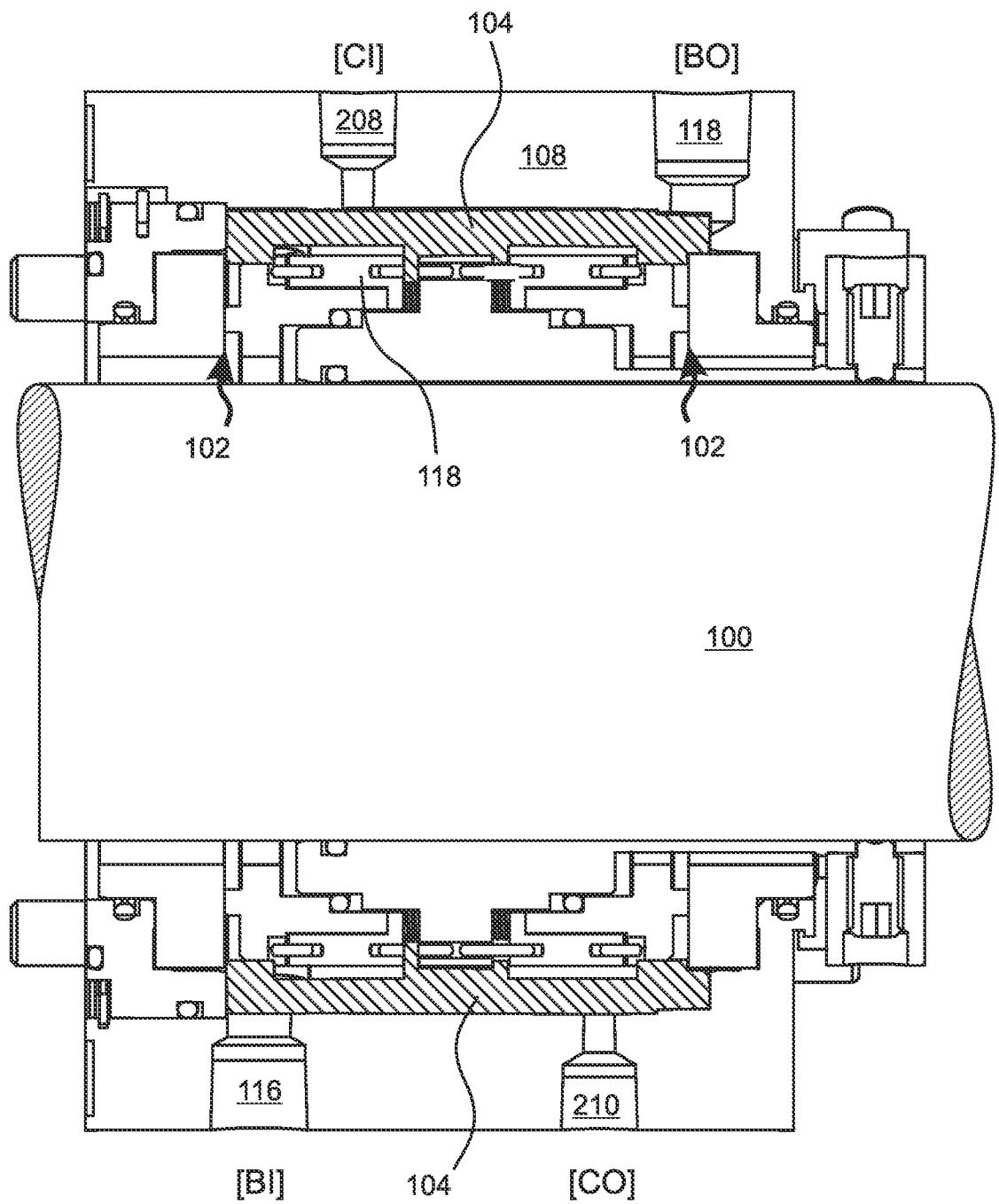
FIG. 2C is a cross-sectional illustration, drawn to scale, of the embodiment of FIG. 2B shown with the cooling channel spool removed therefrom.

FIG. 2C is a sectional view of the seal assembly of FIG. 2B shown with the cooling channel spool 200 removed. The cross-sectional area of the barrier fluid space 104 is cross-hatched in the drawing, thereby obscuring structure within the barrier fluid space 104 that is behind the cross-section plane, and rendering it easier to distinguish between the barrier fluid space 104 and the solid structures that bound it.

For both the cooling space spool 201 of FIG. 2A and the cooling channel spool 200 of FIGS. 2B and 2C, the only significant change as a result of removing the cooling space spool 201 or cooling channel spool 200 is that the buffer fluid space 104 is made larger. But it is clear that the seal assembly can be readily implemented without the cooling space spool 201 or cooling channel spool 200 simply by plugging the cooling inlet 208 and cooling outlet 210. Furthermore, it can be seen that the only added cost of the seal assembly, as compared to an otherwise identical seal assembly that does not accept a cooling space spool 201 or cooling channel spool 200, is the provision of the cooling inlet 208 and outlet 210 fittings, which are simple in design and add very little to the manufacturing cost.

Figure 3:
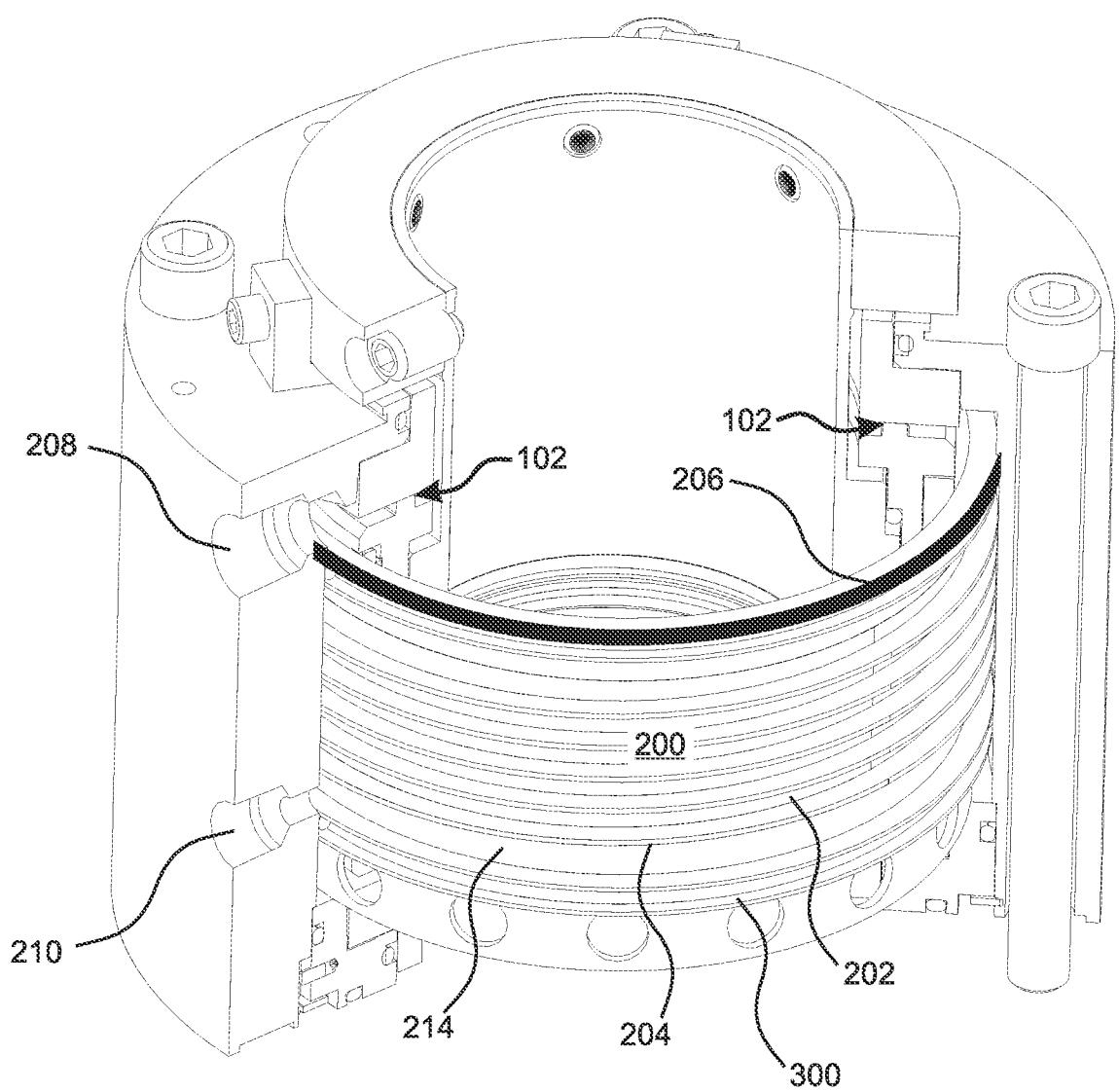
FIG. 3 is a cutaway perspective view of the embodiment of FIG. 2B.

FIG. 3 is a cut-away perspective view of the seal assembly of FIG. 2B shown with ¼ of the seal assembly housing removed in cross-section so that the internal structure can be seen.

FIG. 4 is a perspective view of the cooling channel spool 200 of FIG. 2B shown removed from the seal assembly. The substantially cylindrical cooling core 400 of the cooling channel spool 200 can easily be seen in FIG. 4. It can also be seen in FIG. 4 that, when the cooling channel spool 200 is not installed in the seal assembly, the cooling channel 202 is open on an outwardly facing side thereof and is configured as a spiral trough. This feature renders the cooling channel spool 200 easy to clean when it is removed from the seal. But as can be seen in FIG. 2B, the channel walls 204 are configured such that when the cooling channel spool 200 is installed within the seal assembly, the channel walls 204 extend radially outward into close proximity with a surrounding housing 108 of the seal assembly, thereby limiting any leakage of cooling liquid over the channel walls 204.

With reference again to FIGS. 2A through 2C, spool seals 206 between the cooling spool 201 or channel spool 200 and the surrounding seal assembly housing 108 are provided at both ends of the cooling space spool 201 or channel spool 200, with the cooling space 205 or cooling channel 202 being located therebetween. As a result, any small amount of leakage of cooling liquid that may occur over the end walls 203 or channel walls 204 is contained between the spool seals 206, and thereby prevented from leaking beyond the cooling space spool 201 or cooling channel spool 200. In FIG. 3, the spool seals 206 are O-rings that are installed in seal troughs 300 provided in the cooling channel spool outside of the cooling channel 202, so that the cooling channel 202 is located entirely between the two spool seals 206. In the figure, the lower O-ring 206 has been removed so that the underlying seal channel 300 can be seen.

With reference again to FIGS. 2A through 2C, a coolant inlet 208 and a cooling outlet 210, which are configured in the illustrated embodiments as coolant inlet and outlet fittings 208, 210, are provided on the seal assembly housing 108 that enable connection of a cooling liquid circulating system to the cooling channel 202. However, no part of the cooling space 205 or cooling channel 202 extends into these coolant fittings 208, 210. Instead, the coolant fittings 208, 210 simply terminate in openings through the housing 108 which allow a cooling liquid to enter and exit the cooling space 205 or cooling channel 202 through the coolant fittings 208, 210. Because the outward facing side of the cooling space 205 or cooling channel 202 is open, as can be seen in FIG. 4, and because the ends of the cooling space spool 201 or cooling channel spool 200 are sealed 206 to the housing, there is no need for any special connection or seal between the cooling space 205 or cooling channel 202 and the coolant fittings 208, 210.

As a result, no distortion or modification of the cooling space spool 201 or cooling channel spool 200 is required during installation of the cooling space spool 201 or cooling channel spool 200 into the seal assembly and/or removal thereof from the seal assembly. Accordingly, there is no danger of contact between the rigid cooling space spool 201 or cooling channel spool 200 and any rotating components 122 within the seal assembly.

It can be seen in FIG. 2A that no rotational alignment of the cooling space spool 201 relative to the inlet 208 and outlet 210 fittings is needed. In the embodiment of FIGS. 2B through 4, the cooling channel 202 is terminated on the cooling channel spool 200 by an inlet ring 212 at one end and an outlet 214 ring at the other end. As can be seen in FIG. 4, The inlet 212 and outlet 214 "rings" are actually annular troughs into which the two ends of the cooling channel 202 terminate. In the illustrated embodiment, the cooling rings 212, 214 are somewhat wider than the cooling channel 202. Accordingly, during installation of the cooling channel spool 200 into the seal assembly it is only necessary to axially align the inlet 212 and outlet 214 rings with the coolant inlet 208 and outlet 210 fittings. No rotational alignment of the cooling channel spool 200 is needed. This approach further simplifies the installation process.

In various embodiments, only small and relatively inexpensive adaptations of the seal assembly are required so as to render it compatible with the disclosed cooling space spool 201 or cooling channel spool 200. As such, the adapted seal assembly can be produced in larger quantities and marketed with pre-installed cooling space spools 201 and/or cooling channel spools 200 to customers who anticipate a need to cool the seal assembly, while marketing the same seal assemblies without cooling space spools 201 or cooling channel spools 200 to customers who do not anticipate overheating of the seal assembly, knowing that the disclosed cooling channel spool can be subsequently installed in any of those seal assemblies that unexpectedly experience overheating.

While the present disclosure is presented in terms of "cooling" a seal assembly, it will be understood that, in fact, the present invention is equally applicable to heating of seal assemblies that are intended to seal a process fluid where an elevated fluid temperature is desired, the only adaptation being that the spool seals 206 and any other seals must be made from materials that can withstand the elevated temperature of the process fluid. As such, the "cooling space" and "cooling channel" that are disclosed herein are, in general, "heating or cooling" spaces and channels.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:
1. A rotating shaft seal assembly comprising:
    a seal housing surrounding a rotating shaft;
    a seal cavity formed within the seal housing, the seal cavity being radially bounded by a cylindrical cavity wall, and axially bounded by radially inward extensions of the seal housing;
    a rotating shaft seal located within the seal cavity, the rotating shaft seal comprising a stator seal face fixed to the seal housing and a rotating seal face fixed to the rotating shaft, the seal faces having respective flat, parallel, annular sealing surfaces that are either contacting or closely proximate each other, thereby separating a first fluid, referred to herein as the process fluid, which extends proximate the rotating shaft, from a second fluid that extends radially outward into the seal cavity beyond the rotating shaft seal;
    a cooling inlet and a cooling outlet formed in the seal housing and providing access through the seal housing to the seal cavity without extending into the seal cavity; and
    a cooling spool configured for axially removable insertion into the seal cavity, the cooling spool comprising:
        a substantially cylindrical cooling core having a continuous cylindrical inner surface without any through opening;
        first and second end walls proximate opposing ends of the cooling core; and
        first and second spool seals cooperative with the first and second end walls;
    the cooling spool being configured such that when it is installed within the seal cavity, the cooling core surrounds the rotating shaft without contacting the rotating shaft, and the end walls extend radially outward from the cooling core and are sealed with the cylindrical cavity wall by the spool seals, thereby forming a cooling passage bounded by the cooling core, the end walls, and the cylindrical wall of the seal housing, at least one of the end walls of the cooling spool being axially spaced apart from a nearest one of the radially inward extensions of the seal housing;
    inlet and outlet ends of the cooling passage being in liquid communication respectively with the cooling inlet and cooling outlet when the cooling spool is installed in the barrier fluid space, so that a cooling liquid can be circulated from the cooling inlet through the cooling passage to the cooling outlet without escaping from the cooling passage.

2. The rotating shaft seal assembly of claim 1, wherein the cooling passage is a cooling space that surrounds the cooling core.

3. The rotating shaft seal assembly of claim 1, wherein the cooling passage is a spiral cooling channel that extends through a plurality of revolutions about the cooling core.

4. The rotating shaft seal assembly of claim 3, wherein a cross sectional shape of the cooling channel is substantially a plurality of rectangles or squares.

5. The rotating shaft seal assembly of claim 3, wherein the inlet and outlet ends of the cooling channel terminate in inlet and outlet channel rings, such that liquid access to the cooling channel through the cooling inlet and outlet requires axial alignment of the inlet and outlet channel rings with the cooling inlet and cooling outlet, but does not require rotational alignment of the cooling channel spool with the cooling inlet and outlet.

6. The rotating shaft seal assembly of claim 1, wherein the second fluid is a pressurized buffer barrier fluid that prevents leakage of the process fluid past the annular sealing surfaces.

7. The rotating shaft seal assembly of claim 1, wherein at least one of the spool seals comprises an O-ring installed in a seal trough provided on an outward-facing end of one of the end walls of the cooling spool.

8. The rotating shaft seal assembly of claim 1, wherein the rotating shaft seal is a dual seal comprising at least two pairs of flat, parallel, annular sealing surfaces.

9. The rotating shaft seal assembly of claim 1, wherein the rotating shaft seal is a contacting end face seal.

10. The rotating shaft seal assembly of claim 1, wherein the rotating shaft seal is an end face mechanical seal.

\* \* \* \* \*